(12) United States Patent
Yamada et al.

(10) Patent No.: US 6,281,923 B1
(45) Date of Patent: Aug. 28, 2001

(54) OPTICAL PRINT HEAD

(75) Inventors: Keiki Yamada; Yoshiaki Odai; Ichiro Furuki; Hiroshi Ito, all of Toyko (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/493,668

(22) Filed: Jan. 28, 2000

(30) Foreign Application Priority Data

Apr. 2, 1999 (JP) ................................................ 11-096145

(51) Int. Cl.⁷ .............................. B41J 2/47; G02F 1/1335
(52) U.S. Cl. ............................ 347/239; 347/241; 349/62
(58) Field of Search ............................ 347/239, 236, 347/3, 246, 253, 241; 349/2, 3, 61, 62, 63, 64, 65; 250/559.17, 559.18

(56) References Cited

U.S. PATENT DOCUMENTS

| | | | |
|---|---|---|---|
| 5,046,826 | * | 9/1991 | Iwamoto et al. .................... 349/65 |
| 5,499,112 | * | 3/1996 | Kawai et al. ........................ 347/3 |
| 5,587,816 | * | 12/1996 | Gunjima et al. .................... 349/62 |
| 6,034,710 | * | 3/2000 | Kawabe et al. .................... 347/236 |

FOREIGN PATENT DOCUMENTS

A7256928 10/1995 (JP) .

* cited by examiner

Primary Examiner—N. Le
Assistant Examiner—Hai C. Pham

(57) ABSTRACT

An optical print head, which records an image in accordance with image data on a photosensitive recording medium by exposure/unexposure to light, comprises a light source for emitting light, a light source conversion unit for converting the light into linear light in substantially uniform light quantity in the same direction as a main scanning direction and emitting the linear light. A liquid crystal shutter array selectively passes or shuts out the linear light falling on the recording medium based on the image data.

19 Claims, 11 Drawing Sheets

OPTICAL PRINT HEAD

FIELD OF THE INVENTION

The present invention relates to an optical print head for recording an image on a photosensitive recording medium by exposure/unexposure to light.

BACKGROUND OF THE INVENTION

FIG. 17 is a perspective view schematically showing the configuration of a conventional optical print head disclosed in, for example, Japanese Patent Application Laid-open (JP-A) No. 7-256928. As shown FIG. 17, white light emitted from a point-source halogen lamp 11 is separated into red, green and blue lights by passing through a color liquid crystal shutter 12. The end face of an acrylic rod 13 is irradiated with the lights sequentially with time shifts. The acrylic rod 13, except its light emitting face, is covered with a reflecting foil deposited with aluminum or the like, and has the function of efficiently converting, into linear light, the light entering through the end face of the rod. Consequently, a monochrome liquid crystal shutter array 14 is irradiated with the red, green and blue linear lights sequentially with time shifts.

At this moment, three arrays of pixels corresponding to red, green and blue colors are arranged inside the monochrome liquid crystal shutter array 14, and they each are driven to transmit only the light of a designated color. For example, in the case of the irradiation with the red linear light, only one array of pixels corresponding to the red color can transmit the red linear light while the other two arrays of pixels are kept in a dark state. Each of the red, green and blue linear lights modulated by the monochrome liquid crystal shutter array 14 is focused on a photosensitive sheet 16 by means of a focusing lens array 15. At this time, the photosensitive sheet 16 moves relatively to the monochrome liquid crystal shutter array 14, so as to be exposed at the same position thereof to the red, green and blue linear lights in sequence, thereby obtaining a print image of high quality without any out-of-register colors.

Here, in order to achieve a short printing time, a supertwisted nematic liquid crystal which can respond at high speed of the millisecond order with application of an AC voltage of about 10 kHz is used for the above-described two kinds of liquid crystal shutters (i.e., the color liquid crystal shutter 12 and the monochrome liquid crystal shutter array 14).

According to the conventional optical print head having a configuration as described above, the small-sized color liquid crystal shutter having the red, green and blue filters attached thereto is interposed between the point-source halogen lamp and the acrylic rod for converting the light from the point source into the linear light. The focusing lens array is used to form, on the photosensitive sheet, the linear image formed on the monochrome liquid crystal shutter array, thereby reducing the size and the cost of the optical system for irradiating the photosensitive sheet with the color light emitted from the point-source halogen lamp.

That is, it is sufficient that the color liquid crystal shutter for separating the colors of the white light from the point-source halogen lamp has, at the utmost, such a size as to cover the end face of the acrylic rod. This size is remarkably small in comparison with a printing width of the photosensitive sheet. Furthermore, the constituent elements of the optical print head such as the point-source halogen lamp, and the color liquid crystal shutter for separating the colors, the acrylic rod, the monochrome liquid crystal shutter array and the focusing lens array are arranged in almost close contact with each other along the optical path, so that no special optical path length is required for forming an image or focusing the light. Thus, a very compact color optical print head is realized at a low cost.

However, the conventional optical print head has a problem that there is a large difference in quantity of light exposure of each pixel in the main scanning direction. The quantity of light exposure is more due to the high light intensity nearer the point-source halogen lamp. However, the quantity of light exposure is lower as the light intensity decreases with an increase in the distance from the point-source halogen lamp. As a result, there has arisen the problem of the large difference in quantity of light exposure. Moreover, the use of the acrylic rod and the color liquid crystal shutter has induced a problem of expensiveness of the optical print head.

SUMMARY OF THE INVENTION

The present invention has been accomplished in an attempt to solve the above problems observed in the prior art. It is an object of the present invention to provide an inexpensive optical print head in which a difference in quantity of light exposure is small at any position in a main scanning direction so that an image can be formed in uniform density.

In order to achieve the above objects, the optical print head which records an image in accordance with image data on a photosensitive recording medium by exposure/unexposure to light, comprises a light source for emitting light, a light source conversion unit for converting the light emitted from the light source into linear light in substantially uniform light quantity in the same direction as a main scanning direction so as to emit the linear light, and a liquid crystal shutter array for selectively transmitting or shutting out the linear light emitted from the light source conversion unit based on the image data so as to expose or not the photosensitive recording medium to the linear light.

Other objects and features of this invention will become apparent from the following description with reference to the accompanying drawings.

DESCRIPTION OF THE PREFERRED EMBODIMENTS

The first embodiment of the present invention will be explained below.

Figure 1:
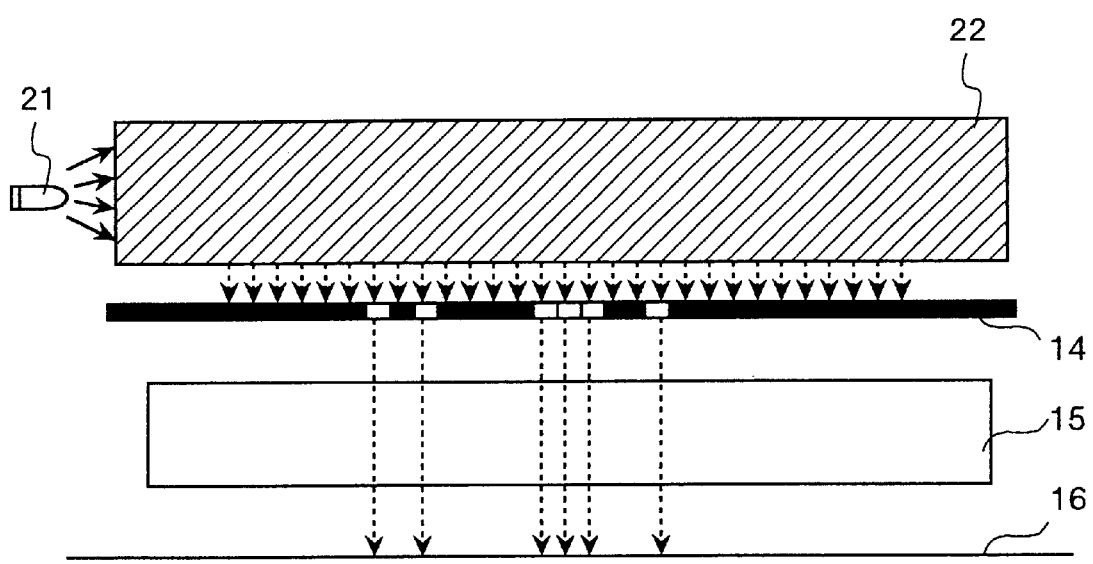
FIG. 1 is a cross-sectional front view showing an optical print head in a first embodiment according to the present invention.
Figure 2:
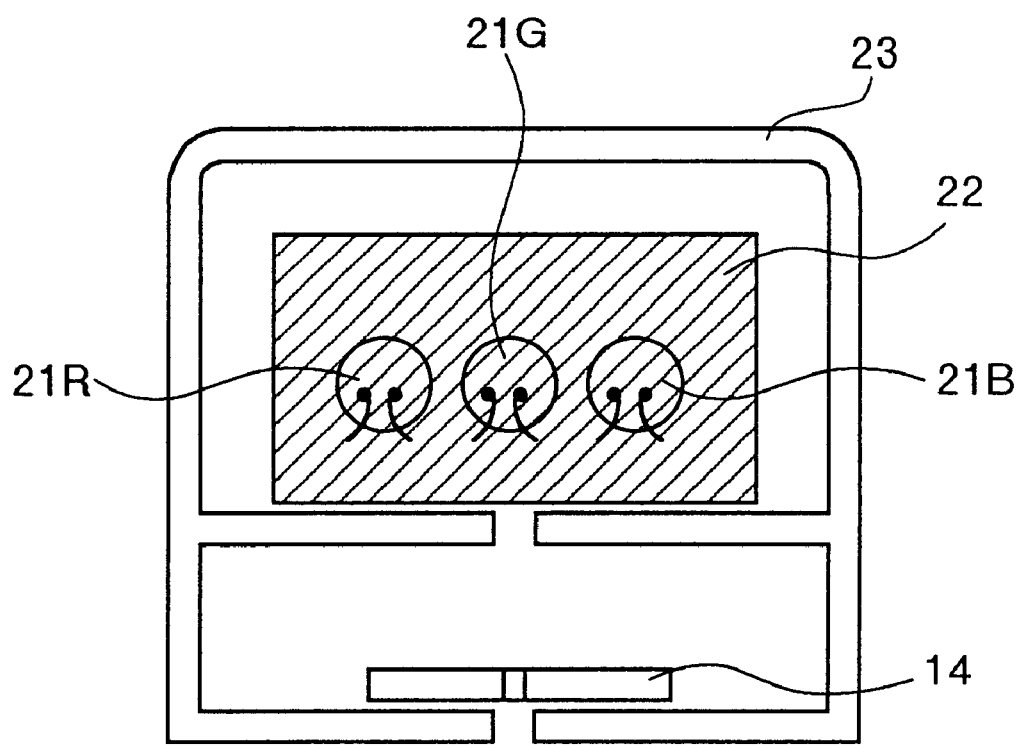
FIG. 2 is a side view showing the optical print head in the firs embodiment according to the present invention.
Figure 3:
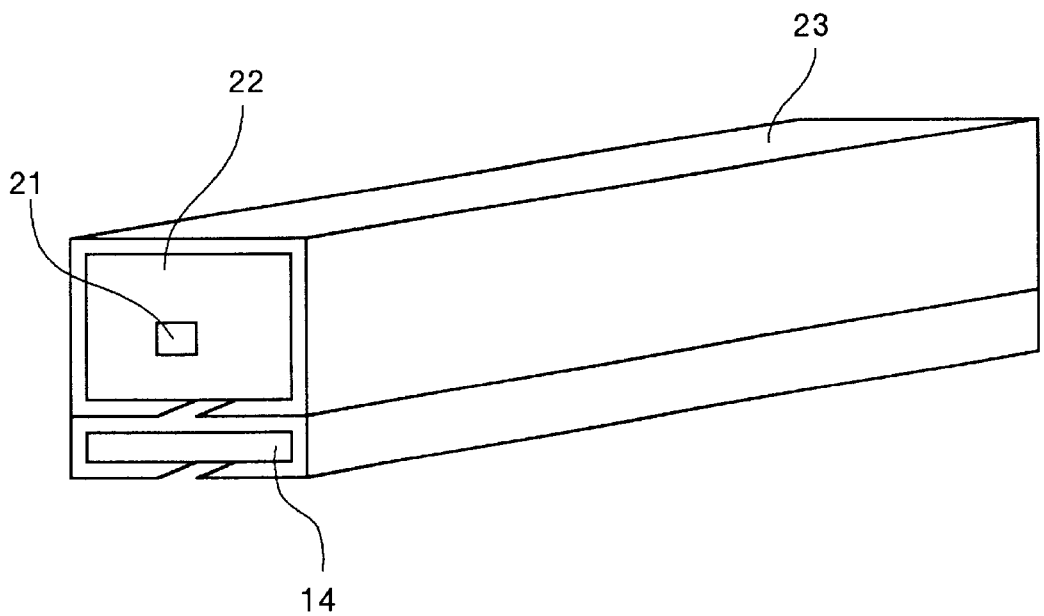
FIG. 3 is a perspective view showing the optical print head in the first embodiment according to the present invention.

FIG. 1 is a cross-sectional front view showing the configuration of an optical print head in the first embodiment according to the present invention. FIG. 2 is a side view showing the optical print head as viewed from the side face (the end face) thereof, in which a direction perpendicular to the drawing sheet is defined as a main scanning direction. and FIG. 3 is a perspective view showing the optical print head. A casing 23 is omitted in FIG. 1, and a focusing lens array 15 is omitted in FIG. 2 and FIG. 3.

In FIG. 1 to FIG. 3, reference numeral 21 designates a light source for emitting light. An LED (a light emitting diode) lamp provided at one end of the optical print head is used for emitting lights of a plurality of colors in an axial direction (the main scanning direction) of the optical print head. Reference numeral 21R denotes a red LED lamp, 21G denotes a green LED lamp, and 21B denotes a blue LED lamp.

Reference numeral 22 designates a light source conversion unit for distributing the lights emitted from the LED lamps 21R, 21G and 21B over the entire main scanning direction and for converting the lights into linear lights in substantially uniform light quantity in the same direction as the main scanning direction so as to emit the linear lights. An acrylic rod having a square cross section is used in the present embodiment.

Reference numeral 14 designates a liquid crystal shutter array for selectively transmitting or shutting out the linear light emitted from the acrylic rod 22 based on image data so as to expose or not a photosensitive recording medium 16 to the light. In this embodiment, a monochrome liquid crystal shutter array having arrays of a plurality of pixels aligned in one array (of one color) in the main scanning direction is used.

Reference numeral 15 designates the focusing lens array for focusing the light transmitted through the monochrome liquid crystal shutter array 14. Reference numeral 16 denotes the photosensitive recording medium which is exposed to the light focused by the focusing lens array 15, and, on which an image in accordance with image data is formed.

Reference numeral 23 denotes the casing for covering the LED lamp 21, the acrylic rod 22 and the monochrome liquid crystal shutter array 14 in an integral manner. The casing 23 is made of a white resin, aluminum or stainless. The casing 23 may be disposed after application of a light reflecting coating to the acrylic rod 22.

Figure 4:
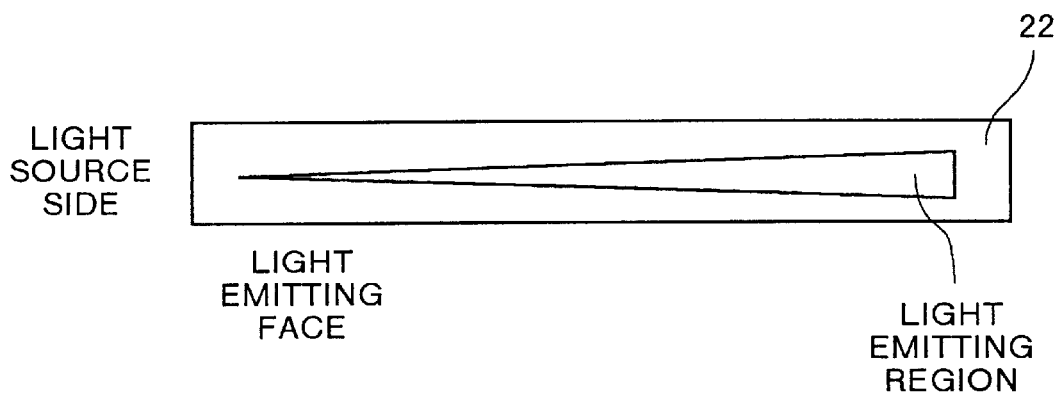
FIG. 4 is a front view showing a light emitting face of an acrylic rod in the first embodiment according to the present invention.

FIG. 4 is a front view showing the configuration of a light emitting face of the acrylic rod 22 (a face of the acrylic rod 22 from where light is emitted). A light emitting region is formed into a shape such that a quantity of the linear light to be emitted from the acrylic rod 22 becomes substantially uniform according to the light intensity at every position inside the acrylic rod 22 by the light emitted from the LED lamp 21. Here, the light emitting region is formed into a triangle enlarging with distance from the light source. The remaining portions of the acrylic rod 22 other than the light entering and emitting faces are formed by depositing metal such as aluminum on at least one or more faces or applying a light reflecting coating or a light diffusing coating such as a white pigment, preferably barium oxide to at least one or more faces.

Next, the operation, function and effect will be explained below.

The photosensitive recording medium 16 in FIG. 1 is transported in the direction perpendicular to the drawing sheet. When the photosensitive recording medium 16 reaches a printing position, first the red LED lamp 21R is lighted. Since the acrylic rod 22 has high reflectivity, the red light emitted from the red LED lamp 21R is reflected and scattered, and further, propagated toward the main scanning direction of the acrylic rod 22, so as to be distributed over the entire main scanning direction. The red light is converted into the linear light in the same direction as the main scanning direction, and then, is emitted from the light emitting face of the acrylic rod 22.

At this moment, when the monochrome liquid crystal shutter 14 transmits the red light at a pixel position to be exposed to the light in accordance with the image data, the transmitted red light is focused by the focusing lens array 15, and thereafter, the photosensitive recording medium 16 is exposed to the red light, thereby forming an image in accordance with the image data.

In the present embodiment, the light emitting region of the acrylic rod 22 is formed into the triangle enlarging with distance from the light source. Therefore, the difference in quantity of the light in the main scanning direction to be emitted from the acrylic rod 22 can be reduced.

Subsequently, the red LED lamp 21R is extinguished and the green LED lamp 21G is lighted. Furthermore, at the same time, the monochrome liquid crystal shutter array 14 transmits or shuts out the light in accordance with the image data. Thus, the photosensitive recording medium 16 is exposed to the green light, thereby forming an image. Sequentially, exposure to the blue light is performed to form an image in the same manner.

In this way, the exposure to the light for one line is completed. During this period, it is sufficient that the photosensitive recording medium 16 is moved by one line. Subsequently, the exposure to the red light is started again. If a size of one dot in a sub scanning direction is set to be equivalent to one line or slightly greater than one line, a next line can be exposed to the light without any clearance. In the case where the photosensitive recording medium 16 is continuously moved, misalignment of ⅓ line occurs among the red, green and blue colors. However, it is a trivial problem in normal use. The exposure of all lines to the light is completed by repetition of the above-described operation, and therefore, an image in accordance with the image data is formed on the photosensitive recording medium 16.

As described above, in the present embodiment, the light emitting region of the acrylic rod 22 is formed into the shape such that the quantity of the linear light emitted from the acrylic rod 22 becomes substantially uniform according to the intensity of the light emitted from the LED lamp 21, that is, into the triangle enlarging with distance from the LED lamp 21. Consequently, it is possible to reduce the difference in quantity of the light in the main scanning direction to be emitted from the acrylic rod 22 so as to achieve the optical print head capable of forming the image in uniform density.

Furthermore, a relatively expensive color liquid crystal shutter is not used but the purpose is solved using the color LED lamp, thus producing the effect of further reducing the cost of the optical print head.

A halogen lamp generally generates a great quantity of heat, thereby making it difficult to confine a halogen lamp inside a narrow space. However, in the present embodiment, since the LED lamp is used, it can be housed inside the casing, thereby producing the effect of miniaturization of the optical print head.

Although the present embodiment has been described by way of the example in which the LED lamp is used as the light source, the light source is not limited to the LED lamp. For example, use of an electroluminescence (EL) light emitting element or the like can produce the same effect as that in the present embodiment. This goes for embodiments described below.

The present embodiment has been described by way of the example in which the three LED lamps for the red, green and blue colors are arranged laterally. However, for example, the vertical arrangement of the three LED lamps of the three colors or use of one LED lamp of an integral type having therein light emitting points of three colors can produce the same effect as that in the present embodiment. This goes for embodiments described below.

Moreover, the present embodiment has been described by way of the example of the monochrome liquid crystal shutter array in which the pixels in one array (of one color) are arranged in the main scanning direction. However, for example, use of a shutter array having pixels in three arrays (of three colors), like the prior art, can produce the same effect as that in the present embodiment. This goes for embodiments described below.

Additionally, the present embodiment has been described by way of the example in which the red LED lamp, the green LED lamp and the blue LED lamp are used as the light sources and the monochrome liquid crystal shutter array is used as the liquid crystal shutter array. However, for example, use of white light as the light source and use of a color liquid crystal shutter array as the liquid crystal shutter array, although they are slightly expensive, can produce the same effect as that in the present embodiment. This goes for embodiments described below.

Furthermore, the present embodiment has been described by way of the example of the use of the focusing lens array for focusing the light transmitted through the monochrome shutter array. However, for example, it may be constituted such that the light diffusion is prevented by shortening the distance between the monochrome liquid crystal shutter array and the photosensitive recording medium so as to omit the focusing lens array. This goes for embodiments described below.

Moreover, the present embodiment has been described by way of the example in which the lights of the LED lamps are emitted in the order of the red, green and blue colors. However, any order of the colors can produce the same effect as that in the present embodiment. This goes for embodiments described below.

Additionally, the present embodiment has been described by way of the example in which the acrylic rod having the square cross section is used as the light source conversion unit. However, the light source conversion unit may be any as long as it can transmit the light. For example, the light source conversion unit made of a material of quartz or glass can produce the same effect as that in the present embodiment. The cross-sectional shape of the light source conversion unit is not limited to a square. For example, a circle or a triangle can produce the same effect as that in the present embodiment. This goes for embodiments described below.

Figure 5:
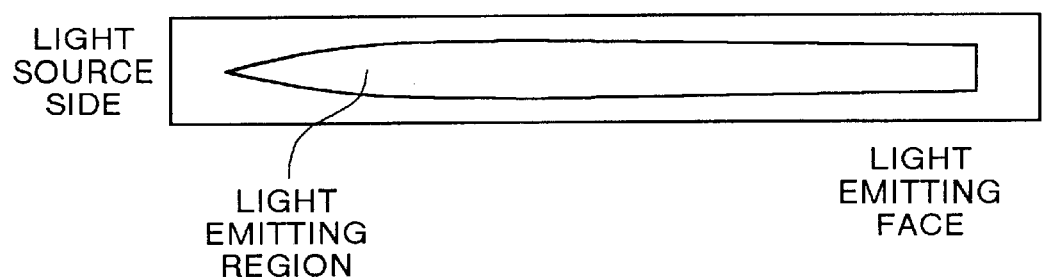
FIG. 5 is a front view showing a light emitting face having another ape of the acrylic rod in the first embodiment according to the present invention.

Still further, although the present embodiment has been described by way of the example in which the light emitting region of the acrylic rod used as the light source conversion unit is formed into the triangle enlarging with distance from the light source. However, the shape of the light emitting region is not limited to a triangle. For example, the light emitting region may be formed in the from of a pen tip, as shown in FIG. 5, although it depends on the arrangement of the light source or the reflecting or scattering condition of the light source conversion unit.

Figure 6:
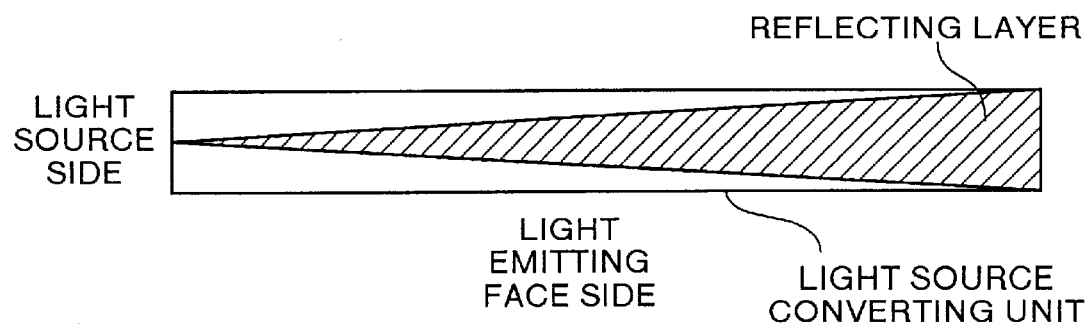
FIG. 6 is a front view showing the acrylic rod provided with a relecting layer in the first embodiment according to the prevent invention.

Furthermore, the shape of the light emitting region may be invariable irrespective of the position, and there may be provided a reflecting layer formed in such a manner as to achieve a substantially uniform quantity of the emitted linear light according to the intensity of the light emitted from the LED lamp. For example, as shown in FIG. 6, there may be provided, at a face other than the light emitting face, a reflecting layer tapering toward the light source and enlarging with distance from the light source. Such a reflecting layer may be defined as a light scattering layer, both of which signify the same.

Unlike the provision of the reflecting layer different in area between positions as shown in FIG. 6, there may be provided a reflecting layer having a uniform area but different reflectivity at different positions. In this case, the reflectivity may become higher with distance from the light source.

In addition, a plurality of rectangular reflecting layers may be provided in such a manner as to be applied or disposed at narrower intervals with distance from the light source. Furthermore, the surface of a light transmitting member on the light source side as the light source conversion unit may be roughened, or the casing may be roughened so as to make the reflectivities different.

Although the light source is disposed on one side of the optical print head in the above-described first embodiment, a description will be given below of a second preferred embodiment according to the present invention in which light sources are disposed at both ends of an optical print head.

Figure 7:
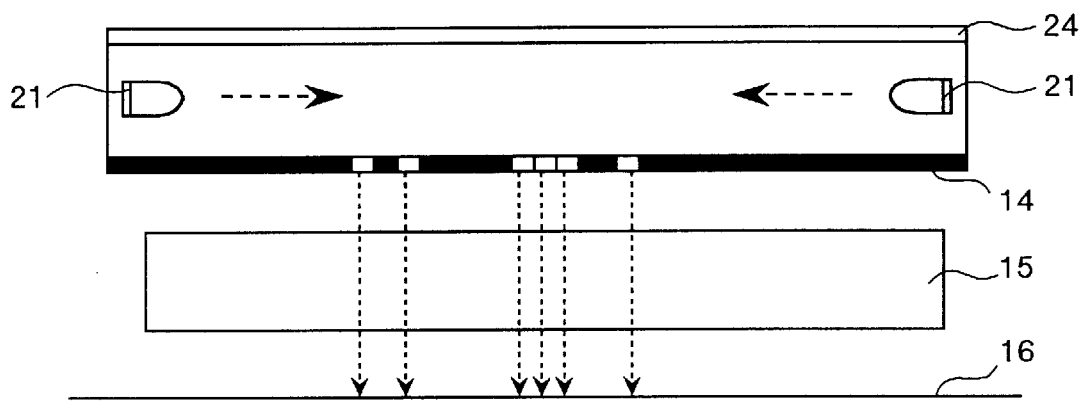
FIG. 7 is a cross-sectional front view showing an optical print hear in a second embodiment according to the present invention.
Figure 8:
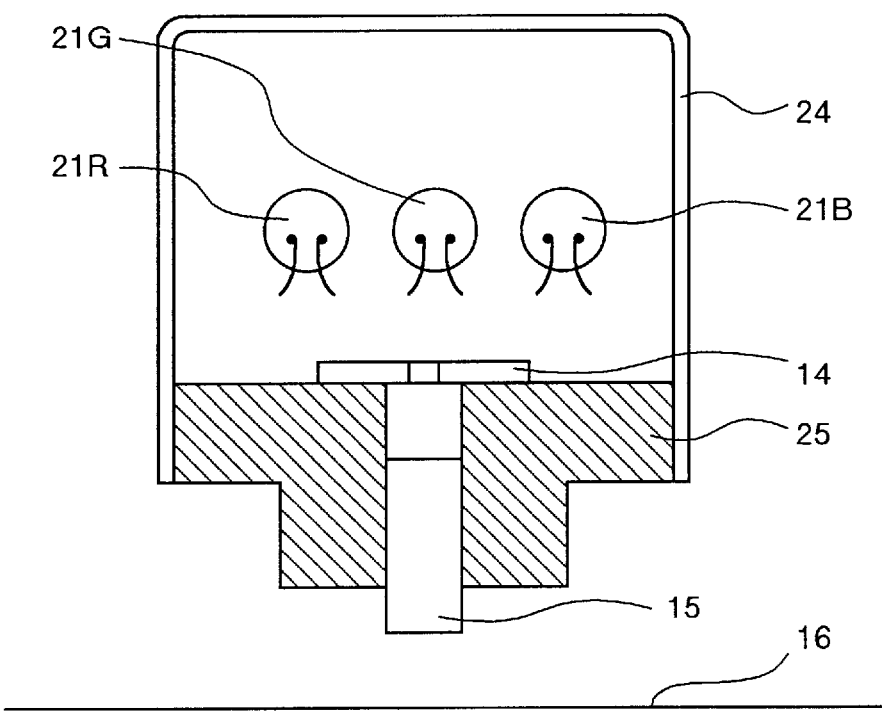
FIG. 8 is a side view showing the optical print head in the second embodiment according to the present invention.

FIG. 7 is a cross-sectional front view showing the configuration of the optical print head in the second preferred embodiment according to the present invention. FIG. 8 is a view of the optical print head as viewed from the side face (the end face), in which a direction perpendicular to the surface of the drawing sheet is defined as the main scanning direction. In FIG. 7, the head base block 25 is omitted. Constituents like or corresponding to those of the optical print head in the first embodiment are designated by the same reference numerals, and their description will be omitted.

As shown in these figures, LED lamps 21 are disposed at both ends of the optical print head, for emitting light toward the center in the axial direction (in the main scanning direction) of the optical print head.

Reference numeral 24 designates a light source conversion unit for allowing the lights emitted from the LED lamps 21R, 21G and 21B to be distribute over the entire main scanning direction and for converting the lights into linear lights in substantially uniform light quantity in the same direction as the main scanning direction so as to emit the resultant linear lights. Here, the light source conversion unit is the light source conversion unit serving as a casing which is constituted in such a manner as to take in, from both ends in the main scanning direction, the lights emitted from the LED lamps 21 disposed at both ends and to contain therein the LED lamps 21 and a monochrome liquid crystal shutter array 14. The light source conversion unit 24, which serves as the casing, is formed by bending an aluminum plate having a thickness of 1 mm into a U shape. Furthermore, the surface inside the aluminum plate is excellently polished such that, for example, the reflectivity of visible light is 95% or more.

Reference numeral 25 designates the head base block for holding the positions of the monochrome liquid crystal shutter array 14 and a focusing lens array 15 and for supporting the light source conversion unit 24 serving as the casing. The head base block 25 herein is made of metal such as aluminum, and may be made of plastic or the like.

Subsequently, the operation, function and effect will be explained below.

The optical print head in the second embodiment is operated in substantially the same manner as the first embodiment. When a photosensitive recording medium 16 reaches the printing position, first the red LED lamps 21R disposed at both ends of the optical print head are simultaneously lighted. Since the light source conversion unit 24 serving as the casing has high reflectivity, red lights emitted from the red LED lamps 21R disposed at both ends of the optical print head travel toward the center of the light source conversion unit 24 serving as the casing, and further, propagate inside the light source conversion unit 24 serving as the casing, and then, are converted into the linear lights parallel to the main scanning direction.

At this moment, in the same manner as the first embodiment, the monochrome liquid crystal shutter 14 transmits or shuts out the red lights at pixel positions to be exposed to the lights in accordance with image data. Thus, an image is formed on the photosensitive recording medium 16 in accordance with the image data.

Subsequently, the red LED lamps 21R disposed at both ends of the optical print head are extinguished and both of the green LED lamps 21G disposed at both ends of the optical print head are lighted at the same time. Simultaneously, the monochrome liquid crystal shutter array 14 transmits or shuts out the lights in accordance with the image data. In the same manner, the photosensitive recording medium 16 is exposed to the green lights, thereby forming an image. Sequentially, exposure to the blue lights is performed to form an image in the same manner.

In simple comparison of the light intensity in the main scanning direction, although the light intensity is slightly decreased at the center of the optical print head which is away from the LED lamps, emission from both ends of the optical print head can reduce a difference in light intensity in the main scanning direction more than emission from only one end, thereby reducing the difference in quantity of the light in the main scanning direction emitted from the light source conversion unit 24 serving as the casing.

As described above, in the present embodiment, the LED lamps are disposed at both ends of the optical print head so as to take in the lights emitted from the LED lamps from both ends in the main scanning direction of the light source conversion unit 24 serving as the casing. Consequently, it is possible to reduce the difference in quantity of the light in the main scanning direction emitted from the light source conversion unit 24 serving as the casing so as to achieve the optical print head capable of forming the image in uniform density.

Moreover, as the relatively expensive acrylic rod is not used as the light source conversion unit but the purpose is solved using the light source conversion unit 24 serving as the casing containing the LED lamps and the monochrome liquid crystal shutter array therein, thus producing the effect of reducing the cost of the optical print head.

Furthermore, the relatively expensive color liquid crystal shutter is not used but the purpose is solved using the color LED lamp, thus producing the effect of further reducing the cost of the optical print head.

Additionally, a halogen lamp generally generates a great quantity of heat, thereby making it difficult to confine a halogen lamp inside a narrow space. However, in the present embodiment, since the LED lamp is used, it can be housed inside the casing serving as a light conducting pipe.

The present embodiment has been described by way of the example in which the head base block is used in order to hold the positions of the monochrome liquid crystal shutter array and the focusing lens array. However, for example, the head base block may be omitted and the shape of the casing may be varied such that the casing may hold the positions of the monochrome liquid crystal shutter array and the focusing lens array. This goes for embodiments described below.

Although the present embodiment has been described by way of the example in which the LED lamps are disposed at both ends of the optical print head, the present invention is not limited to the above-described embodiment. Any configuration is sufficient as long as the light emitted from the LED lamp is taken from both ends in the main scanning direction of the light source conversion unit serving as the casing. For example, a LED lamp may be disposed above the light source conversion unit serving as the casing and reflecting plates may be disposed at the two ends of the light source conversion unit serving as the casing, so that the light emitted from the LED lamp may be reflected on the reflecting plates and then taken into the light source conversion unit serving as the casing. This goes for embodiments described below.

In the above-described second embodiment, as the light source conversion unit is used the light source conversion unit serving as the casing which commonly serves as both the casing and the light source conversion unit in the optical print head. Subsequently, a third embodiment will be explained in which light sources are disposed at both ends of an optical print head, and an acrylic rod covered with a reflecting foil is used as the light source conversion unit.

Figure 9:
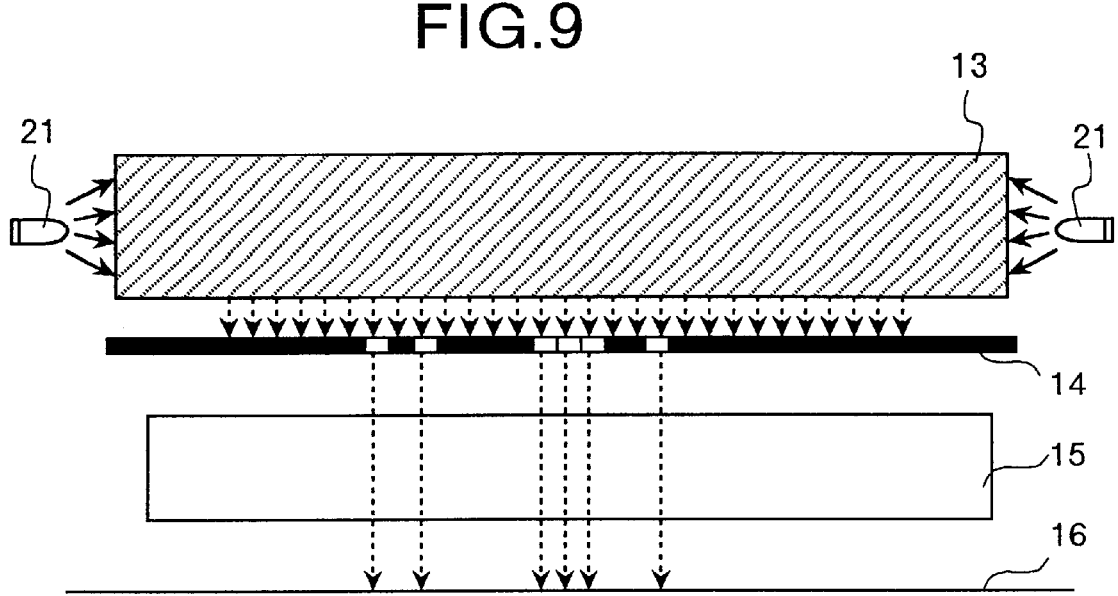
FIG. 9 is a cross-sectional front view showing an optical print head in a third embodiment according to the present invention.
Figure 10:
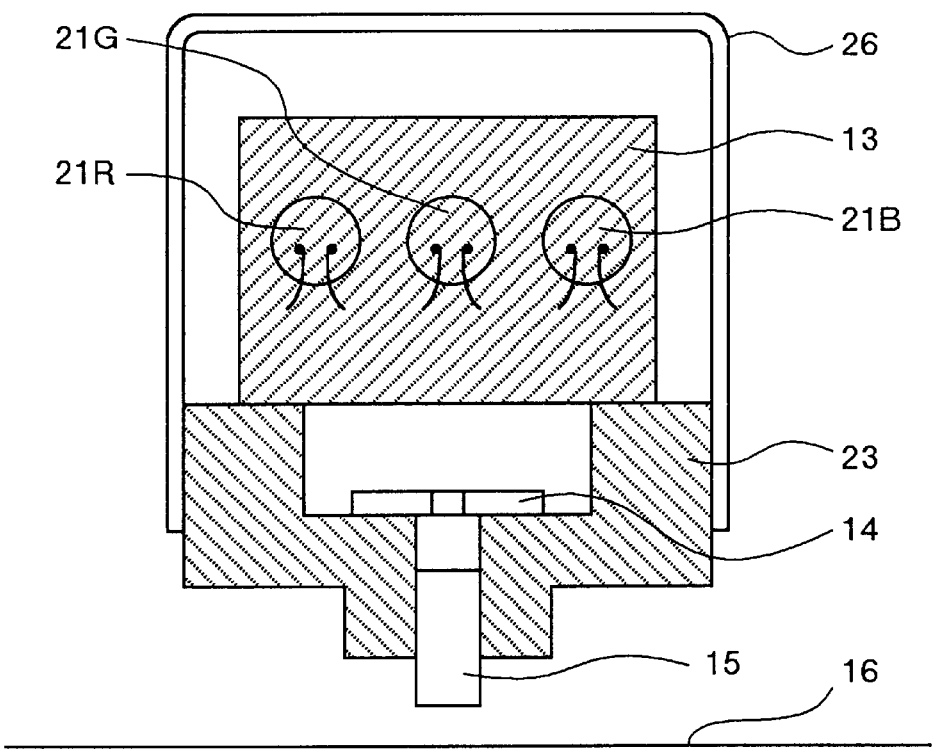
FIG. 10 is a side view showing the optical print head in the third embodiment according to the present invention.

FIG. 9 is a cross-sectional front view showing the configuration of the optical print head in the third preferred embodiment according to the present invention. FIG. 10 shows the optical print head as viewed from the side face (the end face), in which a direction perpendicular to the surface of the drawing sheet is defined as the main scanning direction. In FIG. 9, the head base block 25 and the casing 26 are not shown.

In these figures, reference numeral 13 designates the light source conversion unit, which is the acrylic rod, and is covered with a reflecting foil deposited with aluminum and having a uniform light reflectivity except at the light emitting face. Reference numeral 26 denotes the casing for the optical print head. Since the light is reflected on the surface of the acrylic rod, the inside of the casing particularly need not have high reflectivity. Other constituents are identical to those in the first and second embodiments, and therefore, are designated by the same reference numerals, and their description is omitted.

Subsequently, the operation, function and effect will be explained below.

The optical print head in the third embodiment is operated in substantially the same manner as the first and second embodiments. When red LED lamps 21R are lighted, lights emitted from the red LED lamps 21R are transmitted through the acrylic rod 13 from both ends thereof, to be distributed over the entire main scanning direction, and then, are converted into linear lights in the same direction as the main scanning direction. In the same manner as the first and second embodiments, a monochrome liquid crystal shutter 14 transmits or shuts out the red lights at pixel positions to be exposed to the lights in accordance with image data, thereby forming an image on a photosensitive recording medium 16 in accordance with the image data. Thereafter, exposure to green light and blue light is performed in the same manner, thereby forming an image.

In the case where the light source is disposed only on one side of the acrylic rod 13 having uniform light reflectivity as in the prior art, the light intensity reduces as the distance from the light source increases, thereby inducing a great difference in light intensity between both ends in the main scanning direction. However, in the present embodiment, the light sources are disposed at both ends of the acrylic rod 13, thus reducing the difference in light intensity in the main scanning direction so as to reduce the difference in quantity of the light in the main scanning direction emitted from the acrylic rod 13.

As described above, in the third embodiment, the acrylic rod having uniform light reflectivity is used as the light source conversion unit, the LED lamps are disposed at both ends of the optical print head, and the light emitted from the LED lamps are taken in from both ends in the main scanning direction of the acrylic rod. Consequently, it is possible to reduce the difference in quantity of the light in the main scanning direction emitted from the acrylic rod so as to achieve the optical print head capable of forming an image in uniform density.

Furthermore, the relatively expensive color liquid crystal shutter is not used but the purpose is solved using the color LED lamp, thus producing the effect of reducing the cost of the optical print head.

Additionally, a halogen lamp generally generates a great quantity of heat, thereby making it difficult to confine a halogen lamp inside a narrow space. However, in the present embodiment, since the LED lamp is used, it can be housed inside the casing.

In the above-described embodiments, the difference in quantity of the light in the main scanning direction of the linear light emitted from the light source conversion unit is reduced. A fourth embodiment will be explained below in which a light exposure quantity of a photosensitive recording medium in the main scanning direction is corrected.

Figure 11:
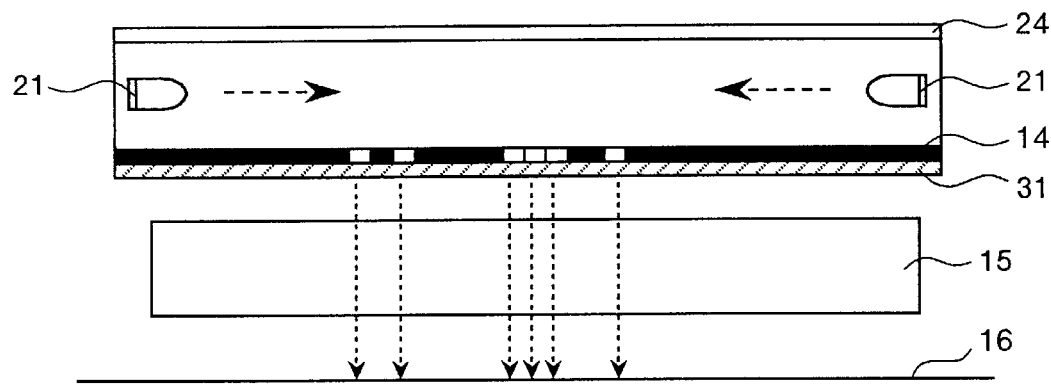
FIG. 11 is a cross-sectional front view showing an optical print head in a fourth embodiment according to the present invention.

FIG. 11 is a cross-sectional front view showing the configuration of an optical print head in the fourth preferred embodiment according to the present invention. In FIG. 11, the head base block 25 is not shown.

In this figure, reference numeral 31 designates a correction unit for correcting an exposure quantity of a photosensitive recording medium 16 at every position in the main scanning direction. Here, the correction unit is composed of a correcting plate having different light transmitting quantities at different positions in the main scanning direction. The correcting plate 31 is made of glass, plastic such as acrylic or polycarbonate, or the like. The correcting plate 31 has a low light transmittance at both ends thereof. Specifically, the light transmittance is almost 100% at the center in the main scanning direction, about 80% at both ends, and it gradually varies between the center and the end. Other constituents are identical to those in the above-described embodiments, and therefore, are designated by the same reference numerals, and their description will be omitted.

Subsequently, the operation, function and effect will be explained below.

Figure 12:
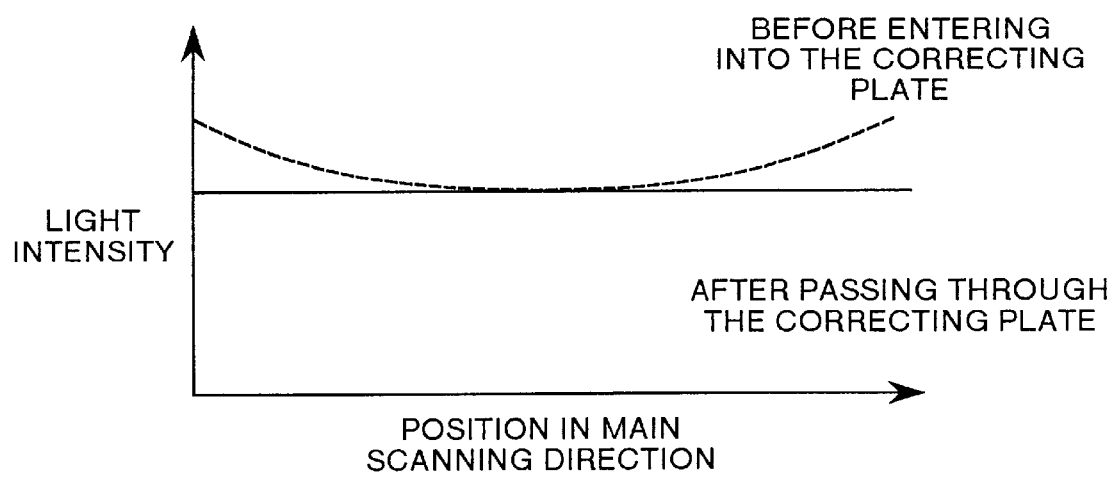
FIG. 12 is a graph of a characteristic curve illustrating the effect of correction by means of a correcting plate in the fourth embodiment according to the present invention.

FIG. 12 is a graph of a characteristic curve illustrating the effect of correction by means of the correcting plate 31 in the fourth embodiment according to the present invention.

A broken line in FIG. 12 indicates the light intensity before entering into the correcting plate 31, that is, the distribution of the light intensity in the main scanning direction in the case where no correcting plate is provided. Lights emitted from LED lamps 21 draw a flat cup-shaped curve, as illustrated in FIG. 12, since the light intensity decreases at the center which is away from both of the LED lamps. Since the light transmittance of a focusing lens array 15 is not varied in the main scanning direction, a recording medium 16 is exposed to the light in the distribution as it is in the case where no correcting plate is provided, thereby inducing variations in density. However, the insertion of the correcting plate 31 having low light transmittance at both ends thereof can attain uniform light intensity in the main scanning direction as indicated by a solid line in FIG. 12, thus achieving the exposure to the light without any variation.

Furthermore, the distribution of the light transmittance of the correcting plate 31 depends upon the distribution of the light intensity in the case where no correcting plate is provided. This is attributable to the structural factor of the light source conversion unit 24 serving as a casing, so that optical print heads exhibit substantially the same distribution in the case of the mass production. Consequently, it is unnecessary to measure the distribution of the light intensity of each of the optical print heads before correction, and therefore, one and the same correcting plate can be used.

Generally, since the light transmittance of the correcting plate 31 cannot be varied in such a manner as to correspond to one pixel, the correcting plate 31 is to correct the distribution of the light intensity from a macroscopic viewpoint to the utmost; namely, this concept is different from another concept in which indefinite variations are corrected from a microscopic viewpoint, for example, the light transmittance of a liquid crystal shutter per pixel is corrected.

As described above, in the fourth embodiment, the correcting plate for reducing the light transmitting quantity at both ends in the main scanning direction by reducing the light transmittance at both ends in the main scanning direction is provided as the correction unit for correcting the light exposure quantity of the photosensitive recording medium at every position in the main scanning direction, thereby attaining uniform light intensity in the main scanning direction. Consequently, it is possible to achieve the uniform light exposure quantity of the photosensitive recording medium in the main scanning direction, thus providing the optical print head capable of forming an image in uniform density.

Although the fourth embodiment has been described by way of the example in which the correcting plate has the uniform thickness and variable transparency as illustrated in FIG. 11, a correcting plate having a uniform transparency but becoming thicker toward both ends thereof may produce the same effect as that in the present embodiment. Moreover, although the correcting plate is disposed under the liquid crystal shutter array in FIG. 11, it may be disposed, for example, above the liquid crystal shutter array, above or under the focusing lens array, or may be brought into contact with or separated from the focusing lens array.

Additionally, although the fourth embodiment has been described by way of the example in which the light sources are disposed at both ends of the optical print head and the correcting plate having low light transmittance at both ends thereof is used, the same effect as that in the present embodiment can be produced by using a correcting plate having low light transmittance on the side where the light source is disposed, for example, in the case where a light source is disposed at either side.

The fourth embodiment has been described by way of the example in which the correcting plate having the small light transmitting quantity at both ends thereof is used as the light exposure quantity correction unit. A fifth embodiment will be explained here in which the light exposure quantity is corrected by varying the light transmitting quantity of a monochrome liquid crystal shutter array.

Figure 13:
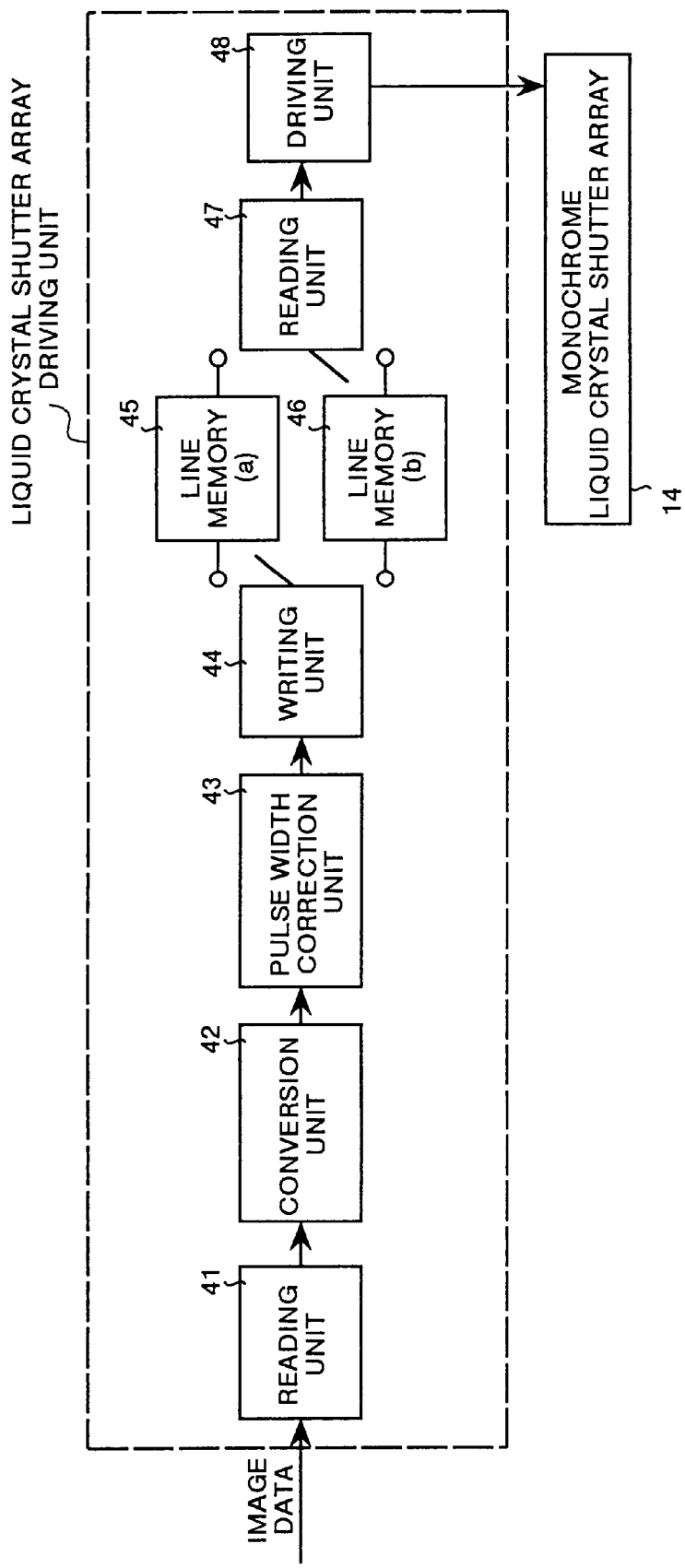
FIG. 13 is a block diagram illustrating the configuration of a liquid crystal shutter array driving unit in a fifth embodiment according to the present invention.

FIG. 13 is a block diagram illustrating the configuration of the liquid crystal shutter array driving unit for driving the monochrome liquid crystal shutter array 14 in an optical print head in the fifth embodiment according to the present invention.

In this figure, reference numeral 41 designates a reading unit for reading image data into the liquid crystal shutter array driving unit, wherein the reading unit reads the image data of one line of a first color, 42 is the conversion unit for converting the image data read by the reading unit 41 into pulse width data, and 43 is a pulse width correction unit for correcting the pulse width data converted by the conversion unit 42 according to each pixel position in a main scanning direction.

Reference numeral 44 denotes a writing unit for writing the pulse width data corrected by the pulse width correction unit 43 in a line memory (a) 45 or a line memory (b) 46, 47 is a reading unit for reading the corrected pulse width data written in the line memory (a) 45 or the line memory (b) 46 by the writing unit 44, 48 is a driving unit for driving the monochrome liquid crystal shutter array 14 based on the corrected pulse width data read by the reading unit 47.

Figure 14:
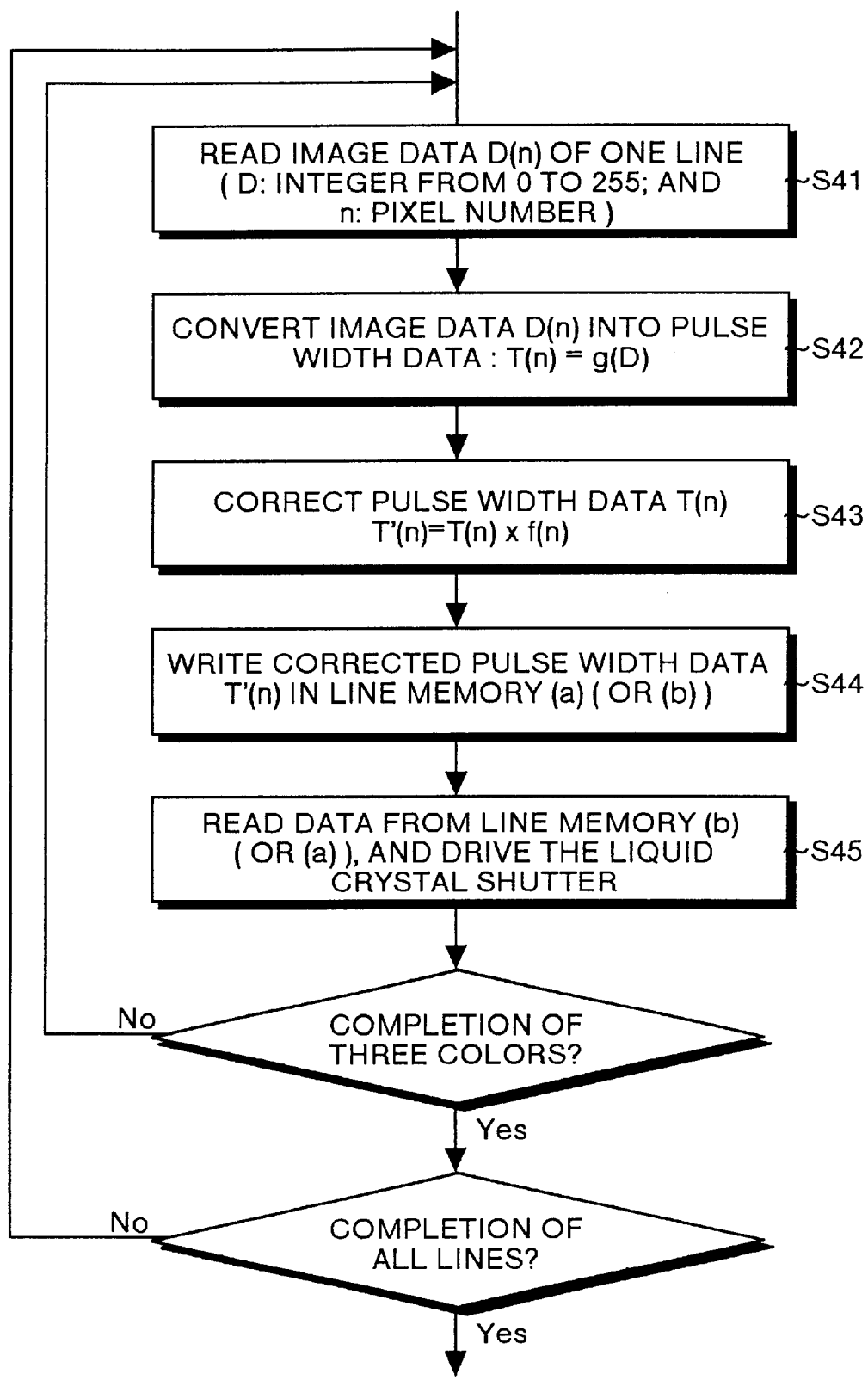
FIG. 14 is a flowchart illustrating the processing of exposure quantity correction in the fifth embodiment according to the present invention.
Figure 15:
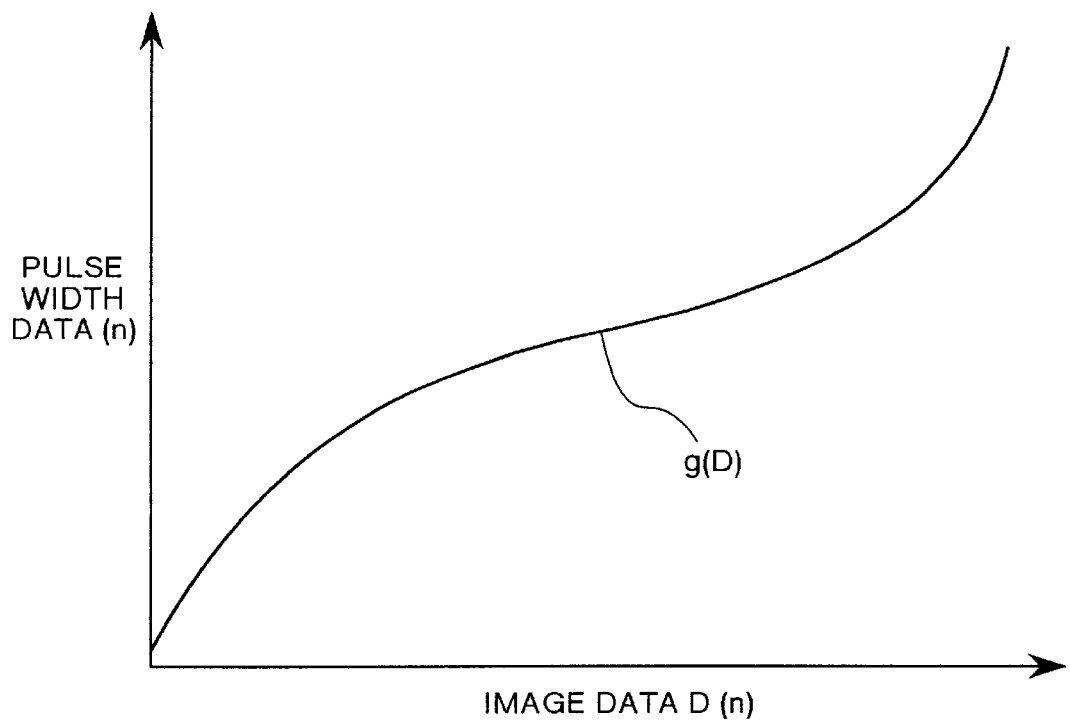
FIG. 15 is a graph of a characteristic curve illustrating the function of converting image data into pulse width data in the fifth embodiment according to the present invention.
Figure 16:
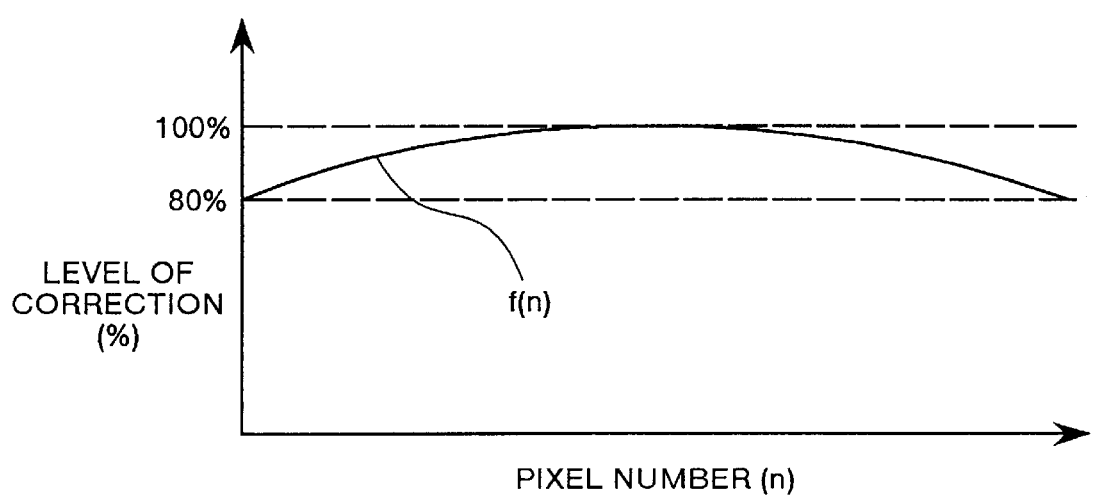
FIG. 16 is a graph of a characteristic curve illustrating the correction function of the pulse width in the fifth embodiment according to the present invention.
Figure 17:
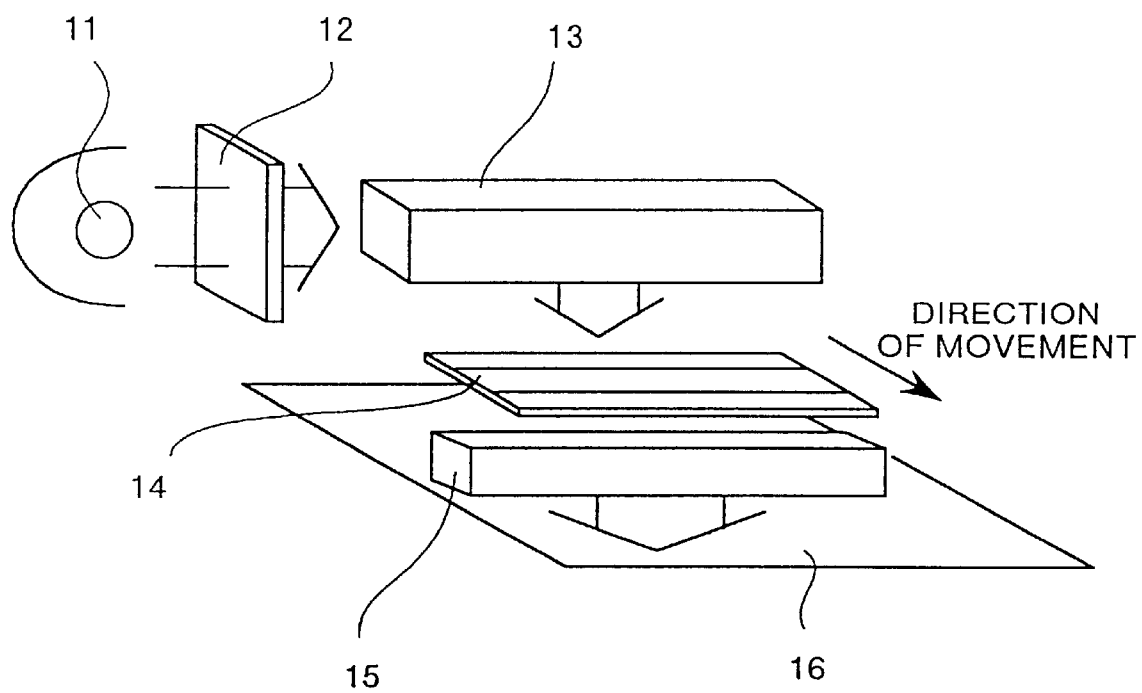
FIG. 17 is a perspective view showing the configuration of a conventional optical print head.

FIG. 14 is a flowchart illustrating the processing of exposure quantity correction. FIG. 15 is a graph of a characteristic curve illustrating an example of a function g(D) for converting the image data into the pulse width data, as illustrated in FIG. 14. FIG. 16 is a graph of a characteristic curve illustrating an example of a correction function f(n) representing how much the pulse width is reduced with respect to a pixel position of a liquid crystal shutter, as illustrated in FIG. 14.

First, the function g(D) will be explained while referring to FIG. 15. The function g(D) is a function for converting the image data into the pulse width data which actually turns on the liquid crystal shutter. In the image data D(n), one pixel is composed of 8 bits (256 gradations from 0 to 255). The pixel number (n) is allocated to the pixels aligned in the main scanning direction in the liquid crystal shutter in sequence from the end. In general, the density of a recorded image does not have the linear relationship relative to the pulse width. Consequently, it is necessary to allow the pulse width to correspond to the image data with a non-linear function in order to allow the density of the recorded image to linearly correspond to the image data. Here, the image data is converted into the pulse width data by using, for example, the function illustrated in FIG. 15 so as to drive the liquid crystal shutter, thereby obtaining substantially linear recording density characteristics with respect to the image data.

Subsequently, the correction function f(n) will be explained while referring to FIG. 16. The horizontal axis of the graph of FIG. 16 represents the pixel number (n), and therefore, corresponds to the position of the pixel in the main scanning direction as it were. The vertical axis represents how much the pulse width is corrected. As described above, since the light intensity is reduced at the center in the main scanning direction if no correction is performed, the pulse width is not so much reduced at the center, i.e., the pulse width is 100%. On the contrary, since the light intensity is too high at both ends, the pulse width is reduced to, for example, about 80%. The correction function f(n) is determined to make light exposure quantities (the product of the light intensity and the pulse width) after the correction constant in the same manner at other portions. In the present embodiment, the pulse width per se is corrected by multiplying the pulse width by the correction function f(n), to be reflected on the transparent light exposure quantity of the liquid crystal shutter array.

The correction process of the light exposure quantity and the operation of the liquid crystal shutter array driving unit will be explained while referring to FIG. 14.

To begin with, the data reading unit 41 reads the image data D(n) of one line of the first color from, for example, a personal computer (step S41). Subsequently, the data conversion unit 42 converts the read image data D(n) into the pulse width data T(n) in accordance with the function g (step S42). The correction unit 43 then multiplies the converted pulse width data T(n) by the correction function f(n) so as to correct the pulse width according to the pixel position in the main scanning direction (step S43). Consequently, the distribution of the light intensity in the main scanning direction is corrected in accordance with the pulse width, so that the light exposure quantity (the light intensity multiplied by the pulse width) becomes uniform in the main scanning direction.

Thereafter, the data writing unit 44 writes the corrected pulse width data T'(n) into the line memory (a) 45 (step S44). Although the reading unit 47 allows the data through only first time, the routine from step S41 is repeated with respect to a second color. In step S44, the writing unit 44 writes the corrected pulse width data T'(n) into the line memory (b) (hereinafter, the line memories (a) and (b) are used alternately). At the same time, the reading unit 47 reads the data of the first color written the previous time from the line memory (a) (hereinafter, the line memories (a) and (b) are used alternately), so that the driving unit 48 drives the liquid crystal shutter based on the corrected pulse width data T'(n) (step S45). Upon completion of this process on the three colors of the first line, a second line is subjected to this process. The entire light exposure is finished upon completion of all lines.

As described above, in the present embodiment, the pulse width correction unit for correcting the pulse width for driving each of the pixels in the monochrome liquid crystal shutter array according to the position of the pixel is provided as the correction unit for correcting the light exposure quantity of the photosensitive recording medium at the respective positions in the main scanning direction, and the liquid crystal shutter array driving unit for controlling the light transmitting quantity of the monochrome liquid crystal shutter array is used. Consequently, it is possible to make the light transmitting quantity of each of the pixels in the monochrome liquid crystal shutter array uniform in the main scanning direction, so as to make uniform the light exposure quantity of the photosensitive recording medium in the main scanning direction, thus achieving the optical print head capable for forming the image in uniform density. Moreover, the correction can be performed without any special member, thus producing the effect of reducing the size of the optical print head.

Although the present embodiment has been described by way of the example in which the two line memories are provided for use in alternately reading and writing operations, the two line memories are provided for the purpose of elimination of a time loss, but are not particularly concerned in the correction which is essential to the present embodiment. No line memory may be provided if the correction processing speed of the image data (steps S41 to S45) is synchronized with the processing speed of the light exposure of the image (the processing speed of image formation), that is, if the image is exposed to the light at real time.

Although the present embodiment has been described by way of the example in which the processings from the reading of the image data (step S41) to the data writing (step S44) are performed line by line (per line), the processings from the reading of the image data (step S41) to the data writing (step S44) may be performed on one pixel and may be repeated per line.

Moreover, the correction unit in the present embodiment may be combined with the unit for correcting microscopic variations per pixel caused by the characteristics of the liquid crystal shutter.

Furthermore, although the present embodiment has been described by way of the example in which the pulse width is corrected so as to make the light exposure quantity uniform, the transmitting light intensity of the liquid crystal shutter, i.e., a driving voltage of the liquid crystal shutter may be corrected, thus producing the same effect as that in the above-described embodiment. In this case, there are provided the conversion unit for converting the image data into voltage data and a voltage correction unit for correcting the converted voltage data.

Additionally, although the correction function f(n) is one kind in the above-described embodiment, for example, fine correction may be performed such that the correction function f(n) to be applied may be diversified according to the size of the pulse width data T(n).

As explained above, the optical print head which records an image in accordance with image data on a photosensitive recording medium by exposure/unexposure to light, comprises the light source for emitting light, the light source conversion unit for converting the light emitted from the light source into linear light in substantially uniform light quantity in the same direction as a main scanning direction so as to emit the linear light, and the liquid crystal shutter array for selectively transmitting or shutting out the linear light emitted from the light source conversion unit based on the image data so as to expose or not the photosensitive recording medium to the linear light. Therefore, there is obtained the effect that an optical print head which can form an image having a uniform density can be realized.

Further, the light source conversion unit is provided with a light emitting region which is formed such that the quantity of the linear light to be emitted becomes substantially uniform in accordance with the intensity of the light emitted from the light source. Therefore, there is obtained the effect that an optical print head which can form an image having a uniform density can be realized.

Further, the light source conversion unit is provided with a reflecting layer which is formed such that the quantity of the linear light to be emitted becomes substantially uniform in accordance with the intensity of the light emitted from the light source. Therefore, there is obtained the effect that an optical print head which can form an image having a uniform density can be realized.

Further, the light source conversion unit is configured such that the light emitted from the light source is taken in from both ends in the main scanning direction. Therefore, there is obtained the effect that an optical print head which can form an image having a uniform density can be realized.

Further, the light source conversion unit is so configured as to contain the light source and the liquid crystal shutter array therein. Therefore, there is obtained the effect that an optical print head which can form an image having a uniform density can be realized.

Further, the optical print head further comprises a correction unit for correcting the light exposure quantity of the photosensitive recording medium in the main scanning direction. Therefore, there is obtained the effect that an optical print head which can form an image having a uniform density can be realized.

Further, the correction unit is composed of a correcting plate whose light transmitting quantity is varied according to positions in the main scanning direction. Therefore, there is obtained the effect that an optical print head which can form an image having a uniform density can be realized.

Further, the correction unit is composed of the liquid shutter array driving unit for controlling the light transmitting quantity of the liquid crystal shutter array according to the positions in the main scanning direction. Therefore, there is obtained the effect that an optical print head which can form an image having a uniform density can be realized.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical print head for recording an image in accordance with image data on a photosensitive recording medium by exposure/unexposure to light, said optical print comprising:
   a light source for emitting light;
   a light source conversion unit for converting the light emitted from said light source into light having substantially uniform light quantity emitted in a main scanning direction;

a liquid crystal shutter array for selectively transmitting or shutting out the light emitted from said light source conversion unit based on the image data so as to expose or not the photosensitive recording medium to the linear light; and a correction unit for correcting the light exposure quantity of the photosensitive recording medium in the main scanning direction, wherein said correction unit is composed of a liquid crystal shutter array driving unit for controlling a light transmitting quantity of said liquid crystal shutter array according to the positions in the main scanning direction.

2. The optical print head according to claim 1, wherein the light emitted by said conversion unit is linear in the main scanning direction.

3. The optical print head according to claim 1, wherein the emitted light interacting with the photosensitive recording medium causes printing of the image on the photosensitive recording medium.

4. An optical print head capable of recording an image in accordance with image data on a photosensitive recording medium, said optical print head comprising:

a first light source; and a light conversion unit that is not light source based, wherein said conversion unit converts light emitted from said first light source into light having substantially uniform light quantity emitted in a main scanning direction;

wherein said light conversion unit has a region having reflection that increases with increasing distance from said first light source and going towards the middle of said region, which increasing reflection renders substantially uniform the quantity of the light to be emitted from said light conversion unit.

5. The optical print head according to claim 4, wherein the light emitted by said conversion unit is linear in the main scanning direction.

6. The optical print head according to claim 4, wherein said region includes a material with reflectivity that increases with increasing distance from said first light source going towards the middle of said region.

7. The optical print head according to claim 6, wherein said material is provided over a reflecting area having a constant width along the main scanning direction.

8. The optical print head according to claim 7, further comprising: a liquid crystal shutter array that selectively transmits or shuts out portions of the light having substantially uniform light quantity emitted from said light conversion unit.

9. The optical print head according to claim 4, wherein said region includes plural reflecting areas provided with separation therebetween that decreases with increasing distance from said first light source while going towards the middle of said region.

10. The optical print head according to claim 4, wherein said region includes a reflecting area having a width that increases with increasing distance from said first light source while going towards the middle of said reflecting area.

11. The optical print head according to claim 10, further comprising a second light source and wherein said width of said reflecting area decreases with decreasing distance from said second light source while going towards said second light source.

12. The optical print head according to claim 4, wherein the emitted light interacting with the photosensitive recording medium causes printing of the image on the photosensitive recording medium.

13. An optical print head capable of recording an image in accordance with image data on a photosensitive recording medium, said optical print head comprising:

a light source;

a light conversion unit that is not light source based, wherein said conversion unit converts light emitted from said light source into light having substantially uniform light quantity emitted in a main scanning direction; and a liquid crystal shutter array that selectively transmits or shuts out portions of the light having substantially uniform light quantity emitted from said light conversion unit based on the image data, wherein said light conversion unit comprises a hollow casing which renders substantially uniform the quantity of the light to be emitted, wherein said hollow casing has two ends and contains said liquid crystal shutter array, and wherein said hollow casing does not contain a light transmitting rod guiding the light to be emitted.

14. The optical print head according to claim 13, wherein the light emitted by said conversion unit is linear in the main scanning direction.

15. The optical print head according to claim 14, wherein said light source is placed above said casing and said two ends comprise light reflecting material.

16. The optical print head according to claim 13, wherein the emitted light interacting with the photosensitive recording medium causes printing of the image on the photosensitive recording medium.

17. An optical print head capable of recording an image in accordance with image data on a photosensitive recording medium, said optical print head comprising:

at least one light source;

a light conversion unit that is not light source based, wherein said conversion unit converts light emitted from said at least one light source into light having substantially uniform light quantity emitted in a main scanning direction;

a liquid crystal shutter array that selectively transmits or shuts out portions of the light having substantially uniform light quantity emitted from said light conversion unit based on the image data; and a liquid crystal shutter array driving unit which modifies a light transmitting quantity of said liquid crystal shutter array according to positions in the main scanning direction, wherein said modified light transmitting quantity corrects nonuniformity of light emitted from said light conversion unit.

18. The optical print head according to claim 17, wherein the light emitted by said conversion unit is linear in the main scanning direction.

19. The optical print head according to claim 17, wherein the emitted light interacting with the photosensitive recording medium causes printing of the image on the photosensitive recording medium.

* * * * *

UNITED STATES PATENT AND TRADEMARK OFFICE
CERTIFICATE OF CORRECTION

PATENT NO.    : 6,281,923 B1
DATED         : August 28, 2001
INVENTOR(S)   : Keiki Yamada, Yoshiaki Odai, Ichiro Furuki and Hiroshi Ito It is certified that error appears in the above-identified patent and that said Letters Patent is hereby corrected as shown below:

<u>Title page,</u>
Please change the title from,
[54] "OPTICAL PRINT HEAD"
to
[54] -- AN OPTICAL PRINT HEAD EMITTING SUBSTANTIALLY UNIFORM LIGHT --

Signed and Sealed this

Thirtieth Day of April, 2002

*Attest:*

*Attesting Officer*

JAMES E. ROGAN
*Director of the United States Patent and Trademark Office*